United States Patent [19]
Eckbreth et al.

[11] 3,777,279
[45] Dec. 4, 1973

[54] DEPOSITION OF POWER IN A MOVING GAS STREAM BY ELECTRIC DISCHARGE MEANS

[75] Inventors: Alan C. Eckbreth, Glastonbury; Arthur E. Mensing, East Hartford; Russell G. Meyerand, Jr., Glastonbury, all of Conn.

[73] Assignee: United Aircraft Corporation, East Hartford, Conn.

[22] Filed: Mar. 30, 1972

[21] Appl. No.: 239,736

[52] U.S. Cl. .................. 331/94.5, 330/4.3, 313/231, 315/111
[51] Int. Cl. ............................. H01s 3/09, H01s 3/22
[58] Field of Search .................... 331/94.5; 313/231; 315/111; 330/4.3

[56] References Cited
UNITED STATES PATENTS
3,633,125   1/1972   Whitehouse ...................... 331/94.5

OTHER PUBLICATIONS
Crocker et al., Electronics Lett. 5(4) Feb. 1969, pp. 63–64.

Primary Examiner—Ronald L. Wibert
Assistant Examiner—R. J. Webster
Attorney—Anthony J. Criso

[57] ABSTRACT

An alternating electric field is capacitively coupled to a direct current electric discharge to enhance the power deposition while maintaining the discharge in a diffuse glow mode. The invention is explained in the practical context of laser applications.

8 Claims, 5 Drawing Figures

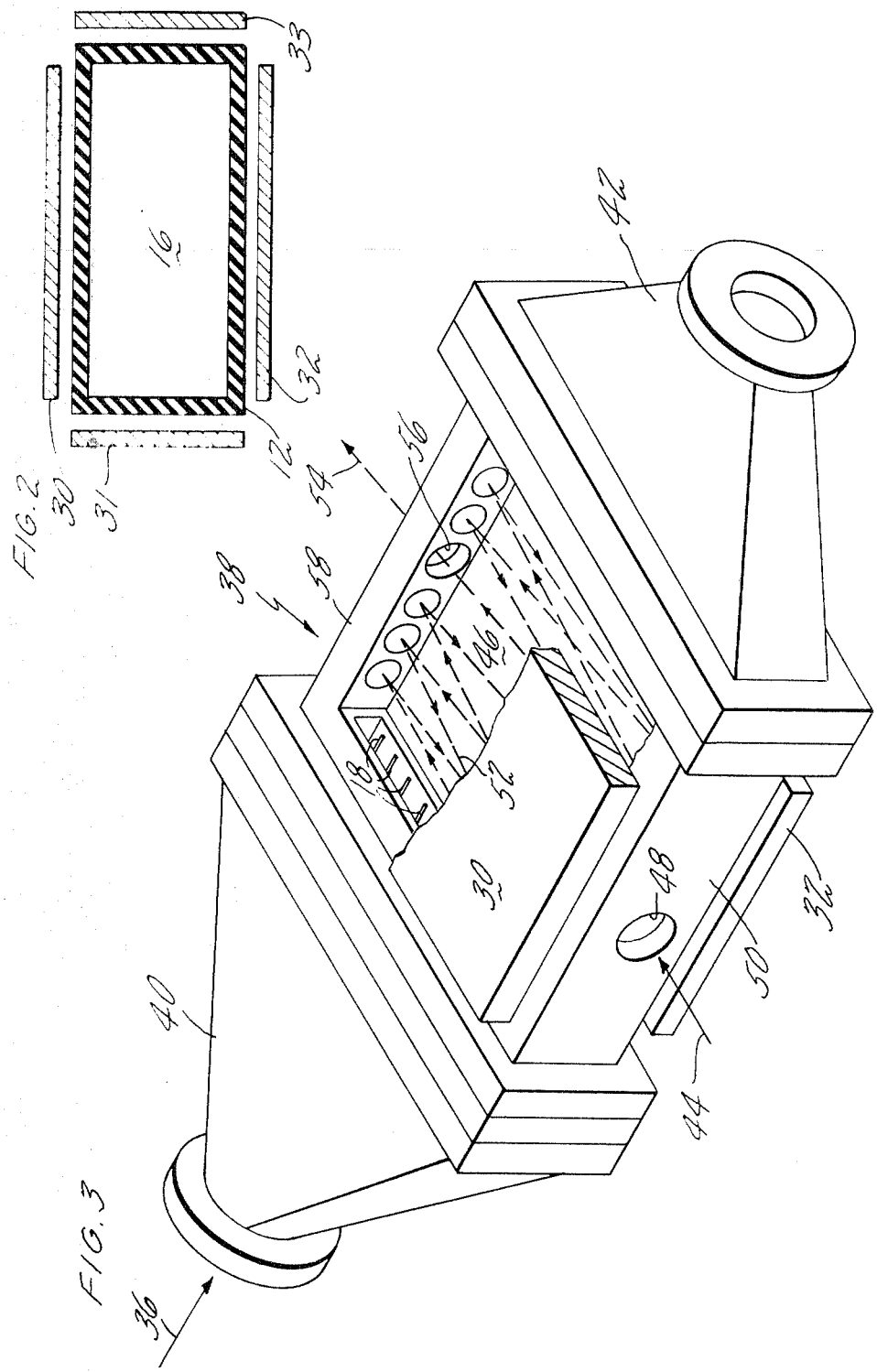

DEPOSITION OF POWER IN A MOVING GAS STREAM BY ELECTRIC DISCHARGE MEANS

BACKGROUND OF THE INVENTION

1. Field of Invention

This invention relates to electric discharges and more particularly to enhancement of the deposition of electric power in a stream of flowing gas. The invention herein described was made in the course of or under a contract or subcontract thereunder, with the Department of the Navy.

2. Description of the Prior Art

Electric discharges of various types are used in a variety of applications. A typical discharge being maintained in a gas between a pair of electrodes is comprised of a positive column section which constitutes the main body of the discharge and sheath regions which are relatively small and constitute the attachment region between the position column and the electrodes. The self-sustaining glow mode discharge is one form of a direct current electric discharge which is of particular interest. A discharge which is sustained in a completely glow mode of operation has both the characteristic positive column section and sheath regions. The positive column is a weakly ionized plasma having an ionized to unionized particle density ratio in the range from approximately $10^{-10}$ to $10^{-8}$; if this ratio were to increase by an order of magnitude or so, the positive column may constrict and assume arc-like characteristics. The sheath regions are transition regions in which the positive column is attached to the electrodes. In the true glow mode attachment, positive ions contained in the discharge region are accelerated toward the cathode when the discharge electric potential is applied between the electrodes; these accelerated ions strike the surface of the cathode, releasing electrons into the gas. Neutral gas molecules in the discharge region become ionized through collisions with the released electrons and complete the process. Contrastingly, an arc mode of discharge occurs in the sheath regions with the same apparatus if the ion bombardment is sufficiently intense that the cathode becomes heated and the electron release therefrom is predominantly by thermionic emission processes as opposed to ion bombardment processes.

When a glow discharge is established within an enclosed region, the entire volume becomes filled with the discharge. The amount of power transferred to the gas can be increased merely by increasing the power to the discharge. However, should the amount of power being transferred to or dissipated through the gas be increased without limit, the glow mode eventually enters into an unstable operational range in which the bulk of the discharge collapses into an arc-like mode, a condition in which substantially all of the electrical energy is dissipated through a relatively small volume in the flowing gas. In the arc-like mode, the conducting gas is subjected to thermal heating which in turn increases the local electrical conductivity of the gas and encourages further intensification of the current flow, an unstable runaway condition if the power dissipation is not limited. It is important to note, however, that the instability in the discharge which causes the glow to collapse is often only a bulk gas effect and is independent of the electrodes. In some instances, there is no difference in the sheath regions at the electrodes for the case of the stable glow mode of discharge which fills the entire discharge volume and the collapsed intense arc-like discharge; only the properties of the bulk discharge are different. The actual physical phenomena which initially causes the collapse are not certain, however, they are believed to be chemical, thermal or electrothermal in nature.

One very useful application for glow discharges is as the pumping or population inversion mechanism in a gas laser, particularly a convective gas laser system. In such applications, it is necessary to excite a sufficient number of molecules into the upper energy levels in the working gas medium to create a population inversion with respect to some lower energy levels in the medium; concomitantly, it is desirable to minimize any effects which tend to reduce the population inversion, particularly those that populate the lower energy levels by thermal effects. For many laser applications, it is necessary to increase the amount of electrical power transferred to the working medium in order to increase the optical output power from the laser. In an open cycle laser system with a gaseous working medium, the gas passes through the system once and is then discarded. Under these operating conditions, the amount of power that can be transferred to the gas in a glow mode discharge is limited essentially by thermal heating considerations which destroy the population inversion. On the other hand, a closed cycle laser system has to contend with contamination of the working medium, gas decomposition, chemical reactions in the plasma and other effects which limit the amount of power that can be deposited in the working medium if a true glow mode discharge is to be maintained therein. There is a threshold for instability onset or a threshold power at which all glow discharges become unstable. Extension of the threshold for instability onset leads to an increase in the power deposition to a flowing gas while the system is maintained in a glow mode of discharge.

SUMMARY OF THE INVENTION

An object of the present invention is to increase the amount of electrical power transferred to a flowing gas in a glow mode discharge.

According to the present invention, an alternating electric field is capacitively coupled to a glow discharge region which is maintained in a gas flowing through a channel by a direct current electric field, the alternating field being applied at an angle to the direct current field; the alternating field enhances the amount of power that can be added to the flowing gas in the glow mode by suppressing the inherent tendency in the positive column of the glow discharge to become unstable and collapse into an arc-like discharge.

In accordance with one form of the invention, an alternating electric field is created at an angle to the direction of the flow of a gas through a laser amplifier device and at an angle to a direct current discharge which is maintained within the amplifier region through the flow. In accordance with the invention in another form, the alternating electric field is maintained at an angle to the direction of flow and the direction of a direct current discharge in a laser oscillator device. In still another form, each of two separate alternating electric fields is maintained at respectively different angles to the direction of gas flow and the direction of a direct current discharge in a laser device.

A principal advantage of the present invention is that an increased amount of power can be transferred to a flowing gas for any given system without the gas bulk transitioning from a glow mode discharge into an arc mode discharge. In addition, this invention has the characteristic of being a relatively simple add-on apparatus which allows enhanced operating characteristics of a flowing gas electric discharge system.

The foregoing and other objects, features and advantages of the present invention will become more apparent in the light of the following detail description of preferred embodiments thereof as illustrated in the accompanying drawing.

BRIEF DESCRIPTION OF THE DRAWING

FIG. 2 is a simplified schematic cross sectional front view of an embodiment of the present invention having two pairs of alternating electric field plate electrodes;

FIG. 3 is a partially broken-away isometric view of a convective electric discharge gas laser embodiment of the present invention;

DESCRIPTION OF THE PREFERRED EMBODIMENT

The present invention provides a basic teaching which can be practiced with a plurality of particular apparatus arrangements. In its broadest sense, the invention relates to the application of alternating electric fields to the positive column section of an electric discharge which is maintained in a stream of flowing gas by a direct current electric field. The angle at which the alternating field current vector intersects with the direct field current vector can vary although a preferred embodiment occurs when the direct and alternating current fields are mutually transverse. The invention is especially useful to enhance the glow mode discharge power and in turn the optical output of a convection gas laser. An even further limited application of this invention involves enhancement of the output power of a convection gas laser which is operated on a continuous basis in a closed cycle system.

Figure 1:
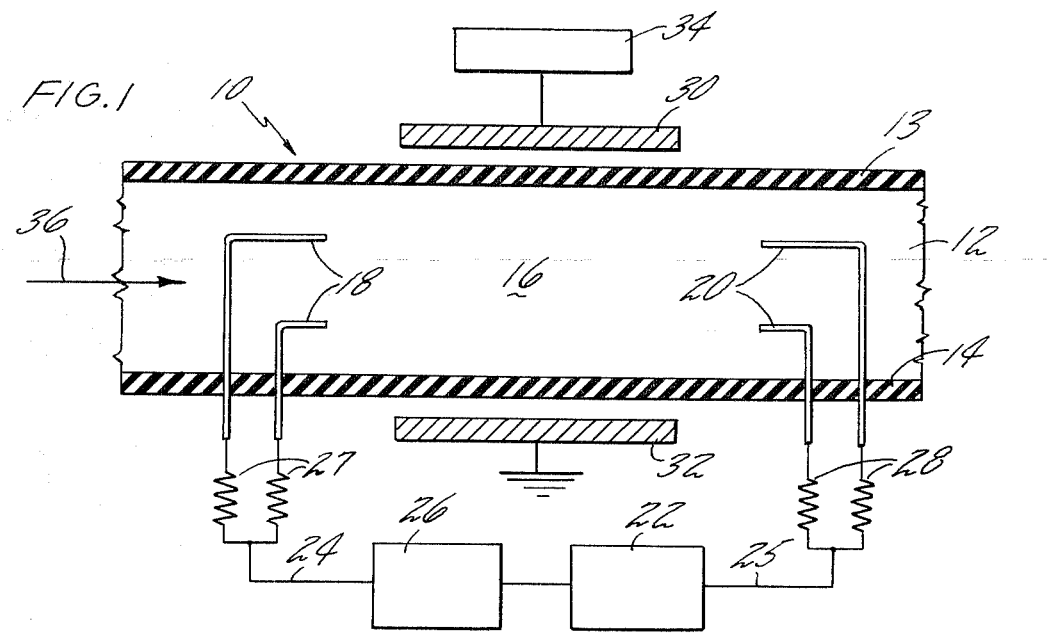
FIG. 1 is a simplified schematic cross sectional side view of an embodiment of the present invention.

An exemplary physical system which incorporates this teaching is shown in FIG. 1 of the drawing. An electric discharge device 10 having a flow channel 12 which includes an upper wall 13 and a lower wall 14 forms a gas flow means having a discharge region 16 between a cathode electrode 18 and an anode electrode 20. The electordes are connected to a source 22 of direct current by electrical conductors 24-25 in series with an electronic ballast unit 26 and electrical resistors 27 and 28. An upper plate 30 and a lower plate 32 each of which is electrically conductive is located immediately above and below the walls 12, 14, respectively of the flow channel. A source 34 of alternating current is connected by electric conducting means 36 to the plate 30; the plate 32 is electrically grounded.

The operation of the electric discharge device shown in FIG. 1 is typically as follows. A suitable gas is convected through the flow channel 12 in a direction 36. An electric field is established between the cathode 18 and the anode 20 with the source of direct current. Positive ions contained in a gas in the region immediately adjacent to the cathode electrodes are attracted to the cathode surface; these positive ions strike the cathode surface and release electrons into the stream of flowing gas. Since the electrons in the discharge region 16 are subjected to the direct current electric field being maintained between the electrodes, they are accelerated in the overall direction 36. The accelerated electrons collide with neutral gas atoms in the discharge region and cause further ionization of the gas, thereby maintaining the establishment of the discharge in the region 16. As is well known in the art, the discharge per se is comprised of a positive column section which consititutes the major portion of the discharge and sheath regions which describe the transitional region of attachment between the positive column portion of the discharge and electrodes. A suitable isolation element such as an inductance coil is placed in the direct current circuit to prevent coupling of power from the alternating field into this circuit. The maximum amount of direct current electric power that can be dissipated in a diffuse glow mode is determined experimentally by trial and error techniques. An alternating electric potential is applied between the plates 30, 32 by the source 34 thereby providing an alternating electric field, transverse in this particular embodiment, to the direction of flow which is also the direction of the direct current discharge between the electrodes. The amount of electrical power which can be deposited in the gas flowing through the discharge region while maintaining the discharge in a glow mode is limited by instabilities which cause the uniform diffuse glow discharge in the positive column section to collapse to a constricted arc-like discharge. The onset of constriction is apparent initially at the downstream end of the positive column, in this instance at the anode. If the circuit providing the direct current electric field is adequately stabilized with suitable electronic elements, the cathode end of the positive column may and often is maintained in a diffused glow mode even though the anode end of the positive column is constricted into an arc-like discharge. Under this condition both the anode and the cathode sheath regions are usually in a glow mode of operation.

Although the exact mechanism whereby the application of an alternating field to a glow discharge suppresses the onset of an arc-like discharge in the bulk volume is not fully understood, two theories have been advanced as explanations of the phenomena involved. According to one theory the application of the alternating field produces greater uniformity of power distribution throughout the discharge region. This discharge uniformity produces a more uniform current density throughout the discharge which in effect minimizes the maximum electron density occurring anywhere in the discharge. This in turn leads to a more uniform distribution of temperature throughout the discharge zone and results in the suppression of thermal and/or electrothermal instabilities. Since the glow discharge is believed to undergo constriction into an arc-like mode due to the presence of contaminant gases, many of which are a result of decomposition of the discharge gas due to the passage of a relatively large current (electron) density through the gas supporting the discharge, this reduction in the maximum electron density reduces the degree of plasma chemistry reactions that can produce contaminant gases; a uniform electron density minimizes the buildup of contaminant gases which are deleterious to the maintenance of the diffuse glow discharge.

An alternate theory for explaining the stabilizing effect is based on the spatial oscillation of the total current density vector in a plane which in turn causes a time averaged suppression of discharge instabilities. More specifically, the interaction of various phenomena in an electric discharge can be described in terms of wave growth. In the case of a direct current discharge which is subjected to a transverse alternating electric field, the vector representing the resultant current density undergoes a periodic spatial oscillation. The constriction can be described analytically in terms of a wave whose growth is unstable in a region which is either symmetric about or perpendicular to the resultant vector of the overall current density. In the unstable region the wave grows and in the stable region the wave is damped; if the rate at which the waves are damped exceeds the rate at which the waves grow, the current density does not reach a magnitude which is high enough to cause the glow discharge to constrict. If the envelope for unstable wave growth has a component perpendicular to the plane of the current density vector oscillation, then suppression of the instability can be achieved by rotation of the total current density vector. This is implemented as is shown in FIG. 2 by the addition of a second pair of alternating field producing electrode plates 31, 33 aligned at an angle to both the direct current vector and the first alternating field, and so phased that the total current density vector rotates in space, the locus of rotation describing a cone. Thus, by the application of an alternating electric field of a suitable frequency and amplitude, the total current density vector is maintained on a time average in a region in which damping predominates and constriction of the discharge does not occur. To accomplish this, the alternating frequency must exceed the growth rate of the unstable wave, and the direction of the alternating field must be at an angle to the direct current discharge.

When the alternating field which is capacitively coupled to the discharge region is applied, much of the power deposition from the alternating field occurs in the region of the flow channel which is immediately adjacent to the walls 13 and 14 due to a resonant absorption effect. The power deposition from the direct current discharge is distributed across the region 16 in a generally parabolic manner with a maximum at the center of the discharge region. Therefore, when the power from both the direct current electric field and the alternating electric field are considered cumulatively, they compliment one another and produce a more uniform distribution of power deposition throughout the entire discharge region.

A partially broken-away convective gas laser employing the teaching of the present invention is shown in FIG. 3. The particular embodiment shown is an eleven-pass amplifier device 38 having an inlet faring 40 and an outlet faring 42. An input beam 44 of laser energy is injected into an optical cavity 46 of the amplifier through an input window 48 in a side wall 50. The beam makes eleven passes in the optical cavity as is indicated by a trace 52 of the ray path, and emerges through as an output beam 54, through an output port 56 which is mounted in a side wall 58. The power contained in the output beam is substantially increased over that of the input beam due to amplification in the optical cavity from the electrically excited gas which has a population inversion. The electrical excitation is provided with a direct current electric discharge between the cathode 18, and an anode element which is contained in the member 42 but not shown in FIG. 2, and a transversely oriented alternating electric field which is capacitively coupled into the gas in the optical cavity by the capacitive plates 30, 32. The laser optical output produced with a laser device such as is shown in FIG. 3 is essentially proportional to the glow-mode electrical input power that can be transferred to the laser gas in the optical cavity. Experimentation has shown that the highest laser output is obtained when the electrical input power per pound of flow rate of laser gas is maintained between 200 and 300 kilowatts per pound mass per second. Experiments have shown also that if the discharge specific power is increased beyond the indicated range the gas in the discharge region becomes heated and results in a reduced laser operating efficiency.

Figure 4:
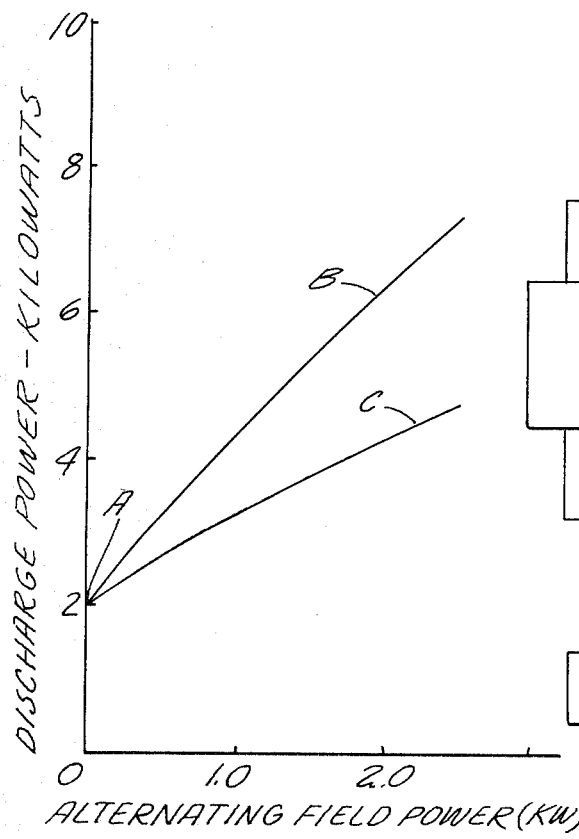
FIG. 4 is a graph showing the discharge power as a function of the alternating electric power for a discharge enhanced in accordance with the present invention.

The effect of alternating electric field enhancement of electrical power deposition in a direct current discharge of a laser such as the one shown in FIG. 3 is shown dramatically in FIG. 4. The curves plotted are merely indicative of a particular laser system and are useful for showing the relative quantities of electrical power deposition, however, the absolute magnitude of the power has no significance with respect to other laser systems. Point A on the ordinate shows that a maximum of two kilowatts of power deposition could be accomplished while maintaining the discharge in a diffuse glow mode without any discharge constriction. When an alternating field was applied to the discharge, (in this case a radio frequency field was used) the total power deposition in the gas was increased several times over this maximum to approximately 7 kilowatts as is illustrated by curve B of FIG. 4. It should be noted that when the discharge was enhanced with an alternating field, the amount of direct current power dissipated in the discharge was increased over what was otherwise possible as is indicated by curve C.

Figure 5:
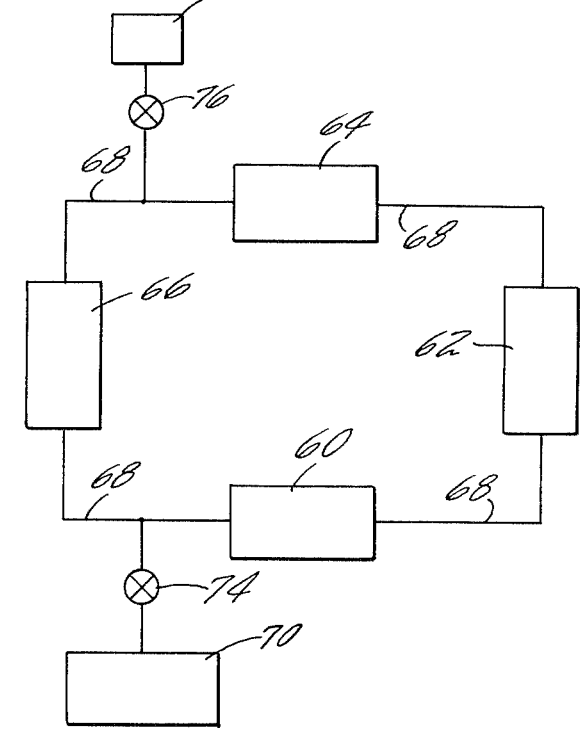
FIG. 5 is a schematic block diagram of a typical closed cycle gas laser system employing the present invention.

The present invention is shown schematically in a laser embodiment which is but one element in a closed cycle convective laser system in FIG. 5. A simplified loop is comprised of a laser device 60, a first cooler 62, a gas circulator 64, a second cooler 66 and suitable conduits 68. A laser gas source 70 and a vacuum pump 72 are connected to the basic loop through suitable conduits containing isolation valves 74 and 76, respectively. The operation of the system is straightforward. With the valve 76 in an open position, the vacuum pump is used to evacuate the entire loop. Then the vacuum pump is isolated from the loop by closing the valve 76 and laser gas from the source 70 is bled into the loop by opening the valve 74. The gas circulator 64 establishes a pressure differential within the system which provides flow of the laser gas through the loop. The second cooler 66 removes the heat of compression that is inevitably added to the laser gas by the gas circulator 64; the first cooler 62 removes heat which is added to the laser gas due to the electric discharge in the laser device 60. With a relatively minor amount of apparent modification, the closed cycle system can be operated as an open cycle system.

Although this invention has been shown and described with respect to preferred embodiments thereof, it should be understood by those skilled in the art that the foregoing and various other changes and omissions in the form and detail thereof may be made therein without departing from the spirit and scope of the invention.

Having thus described typical embodiments of our invention, that which we claim as new and desire to secure by Letters Patent of the United States is:

1. The method of operating a glow mode electric discharge in a gas across a discharge region having cathode and anode electrode means comprising the steps of:
   flowing a gas through the discharge region;
   providing a direct current electric field between the cathode and anode to ionize the gas in the discharge region and to produce a glow mode electric discharge plasma;
   providing a first alternating electric field to the discharge region at a first angle to the direction of the direct current discharge to suppress the inherent instabilities in the plasma that induce the discharge to transition from a diffuse glow mode to a constricted arc-like mode in the plasma bulk volume;
   increasing the amount of power dissipation in the gas by the direct current field, while maintaining the discharge in a glow mode, to a level which is greater than the direct current dissipation possible without the first alternating frequency field thereby enhancing the total power dissipation in the gas; and
   maintaining the total power dissipation within the range of two hundred to three hundred kilowatts per pound mass per second of flowing gas.

2. The method of operating a glow mode electric discharge in a gas across a discharge region having cathode and anode electrode means comprising the steps of:
   flowing a gas through the discharge region;
   providing a direct current electric field between the cathode and anode to ionize the gas in the discharge region and to produce a glow mode electric discharge plasma;
   providing a first alternating electric field to the discharge region at a first angle to the direction of the direct current discharge to suppress the inherent instabilities in the plasma that induce the discharge to transition from a diffuse glow mode to a constricted arc-like mode in the plasma bulk volume;
   increasing the amount of power dissipation in the gas by the direct current field, while maintaining the discharge in a glow mode, to a level which is greater than the direct current dissipation possible without the first alternating frequency field thereby enhancing the total power dissipation in the gas; and
   providing a second alternating electric field to the discharge region at a second angle to the direction of the direct current discharge to suppress the inherent instabilities in the plasma, the second angle being different from the first angle.

3. The method according to claim 2 including the additional step of:
   phasing the two alternating electric fields to spatially rotate the total current density vector of the electric discharge on a conical locus.

4. In an apparatus for the transfer of electric power to a stream of flowing gas, the combination comprising:
   a flow channel to direct the stream of gas through the apparatus;
   electrode means located within the channel to transfer electric power to the stream of gas as a uniform, stable, glow mode, electric discharge having a positive column, the electrode means comprising an upstream electrode and a downstream electrode; and
   a pair of electrode plates each one of which is located adjacent to and on opposite sides of the flow channel, the electrode plates extending along the channel to provide a first alternating electric field transverse to the direction of the gas stream for supplying additional electrical power to the discharge and for suppressing inherent instabilities in the discharge which precipitate collapse of the discharge from a glow mode to a constricted arc type discharge.

5. The apparatus according to claim 4 including further a second pair of electrode plates each one of which is located adjacent to and on opposite sides of the channel and extending along the channel to provide a second alternating electric field transverse to the direction of the gas stream and at an angle to the direction of the first electric field.

6. The invention according to claim 4 wherein each of the electrode plates is inclined with respect to the direction of gas flow through the channel, the angle defined by the facing surfaces of the inclined plates being less than ninety degrees.

7. In a convection laser apparatus for the transfer of electric power to a stream of flowing gas, the combination comprising:
   a rectangular flow channel to direct the flow of the gas through the apparatus;
   electrode means located within the channel to transfer electric power to the stream of gas as a uniform, stable, glow mode, electric discharge having a positive column which is substantially symmetric about a plane extending through the channel, the electrode means comprising:
      a plurality of upstream electrodes positioned about a plane which is transverse to the direction of flow and at an upstream station in the channel; and
      a downstream electrode positioned about a plane which is transverse to the direction of flow and at a downstream station in the channel, the downstream electrode extending substantially across the entire channel; and
   a pair of flat electrode plates each one of which is located adjacent to and on opposite sides of the flow channel, the electrode plates to provide a first alternating electric field transverse to the flow direction of the gas stream for supplying additional electrical power to the discharge and for suppressing inherent instabilities in the discharge which precipitate collapse of the discharge from a glow mode to a constricted arc type discharge.

8. The apparatus according to claim 7 including further a second pair of electrode plates each one of which is located adjacent to and on opposite sides of the channel to provide a second alternating electric field transverse to the direction of the gas stream and at an angle to the direction of the second electric field.

* * * * *